United States Patent
Mameri et al.

(10) Patent No.: US 8,812,565 B2
(45) Date of Patent: Aug. 19, 2014

(54) OPTIMIZING BROWSER CACHING THROUGH DETERMINISTIC MARKING OF FILES

(75) Inventors: Frederico Mameri, Seattle, WA (US); Elisabeth Olson, Bellevue, WA (US); Andrew Sean Watson, Seattle, WA (US); Mark Walker, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 435 days.

(21) Appl. No.: 12/905,641

(22) Filed: Oct. 15, 2010

(65) Prior Publication Data

US 2012/0096058 A1 Apr. 19, 2012

(51) Int. Cl.
*G06F 12/00* (2006.01)
*G06F 17/30* (2006.01)

(52) U.S. Cl.
CPC .............. *G06F 17/30902* (2013.01)
USPC ............ 707/827; 707/821; 707/822

(58) Field of Classification Search
CPC ................................ G06F 17/30902
USPC ......................... 707/827, 821, 822
See application file for complete search history.

(56) References Cited

U.S. PATENT DOCUMENTS

| | | | | |
|---|---|---|---|---|
| 7,159,014 B2* | 1/2007 | Kausik et al. | ............... | 709/217 |
| 2003/0182357 A1* | 9/2003 | Chess et al. | ............... | 709/203 |
| 2007/0180125 A1* | 8/2007 | Knowles et al. | ............... | 709/227 |
| 2007/0198734 A1* | 8/2007 | Knowles et al. | ............... | 709/230 |
| 2011/0161825 A1* | 6/2011 | Tierney et al. | ............... | 715/736 |
| 2011/0264731 A1* | 10/2011 | Knowles et al. | ............... | 709/203 |

OTHER PUBLICATIONS

"Prevent Browser Caching of Dynamic Content", Retrieved at << http://www.webreference.com/programming/javascript/rg33/2.html >>,—Published Date: Mar. 12, 2010, p. 5.
"Caching Behavior of Web Browsers", Retrieved at << http://www.f5.com/pdf/white-papers/browser-behavior-wp.pdf >>, Nov. 2007, p. 10.
Tewari, et al., "WCDP: A protocol for web cache consistency",— Retrieved at << http://www.google.co.uk/url?sa=t&source=web&cd=8&ved=0CCwQFjAH&url=http%3A%2F%2Fciteseerx.ist.psu.edu%2Fviewdoc%2Fdownload%3Fdoi%3D10.1.1.8.49%26rep%3Drep1%26type%3Dpdf&rct=j&q=Web%20Cache%20Invalidation%20Protocol&ei=gfZYTMWGKJCi0gSQhKTcCA&usg=AFQjCNEMDoiYmlYSAGxXApeN6Fc8c9HxmA&cad=rja >>, Aug. 4, 2010, p. 6.
"Using a far future expires header", Retrieved at << http://cjohansen.no/en/apache/using_a_far_future_expires_header >>, Aug. 4, 2010, p. 6.
"Best Practices for Speeding Up Your Web Site"., Retrieved at << http://developer.yahoo.com/performance/rules.html#etags >>, Aug. 4, 2010, p. 14.
"Cache Control", Retrieved at << http://www.seoconsultants.com/articles/1000/cache-control >>, Aug. 4, 2010, p. 6.

* cited by examiner

*Primary Examiner* — Etienne Leroux
*Assistant Examiner* — Jared Bibbee
(74) *Attorney, Agent, or Firm* — Tom Wong; Jim Ross; Micky Minhas

(57) ABSTRACT

Enhanced browser caching is provided through a file identifier attribute employed at a front end server level for deterministic marking A front end server may use an attribute of a file identifier such as an attached parameter, a pattern, a directory associated with the file, or similar attributes to change the links it emits into other content in order to prompt the browsers to request new files. The attribute may be changed (e.g. incremented) based on a web change associated with the content being served.

20 Claims, 6 Drawing Sheets

OPTIMIZING BROWSER CACHING THROUGH DETERMINISTIC MARKING OF FILES

BACKGROUND

In the global workplace, collaboration services provide versatile technologies to businesses and organizations to increase the efficiency of business processes and improve team productivity. Collaboration tools help diverse users stay connected across organizational and geographic boundaries. Collaboration services provide geographically diverse users access to information based on their needs.

Collaboration services help work teams stay connected and productive by providing easy access to team members, documents, and information. Expanded connectivity enables team members to make informed decisions and improve efficiency. And, recent enhancements in collaboration services, further improve upon sharing documents, tracking tasks, using e-mail efficacy, and idea and information sharing.

Modern collaboration services provide a single workspace for teams to coordinate schedules, organize documents, and participate in discussions within and outside the organization infrastructure. Services enable simplified authoring and managing of documents, and help to ensure document integrity with enhanced features such as: requiring document checkout before editing, viewing past revisions, restoring to previous versions, and setting document specific security. Despite increasingly available broadband connections and higher bandwidths, collaboration systems based on files stored strictly at a central location are at the mercy of connection quality. When connections are severed or link quality is reduced, user experience in collaborative environments may be degraded. On the other hand, local storage of documents is inherently against the collaborative service principles.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to enhanced browser caching by employing a file identifier attribute at server level for deterministic marking. According to some embodiments, a front end server may use an attribute of a file identifier such as an attached parameter, a pattern, a directory associated with the file, or similar attributes to determine whether or not to tell the client to cache the file being served. If a change is detected by the front end server, the server may provide an updated link to the file to any browser requesting that file. Otherwise, browsers may continue using the cached version without the browser having to keep track of the file status or a back end server being burdened with multiple requests.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
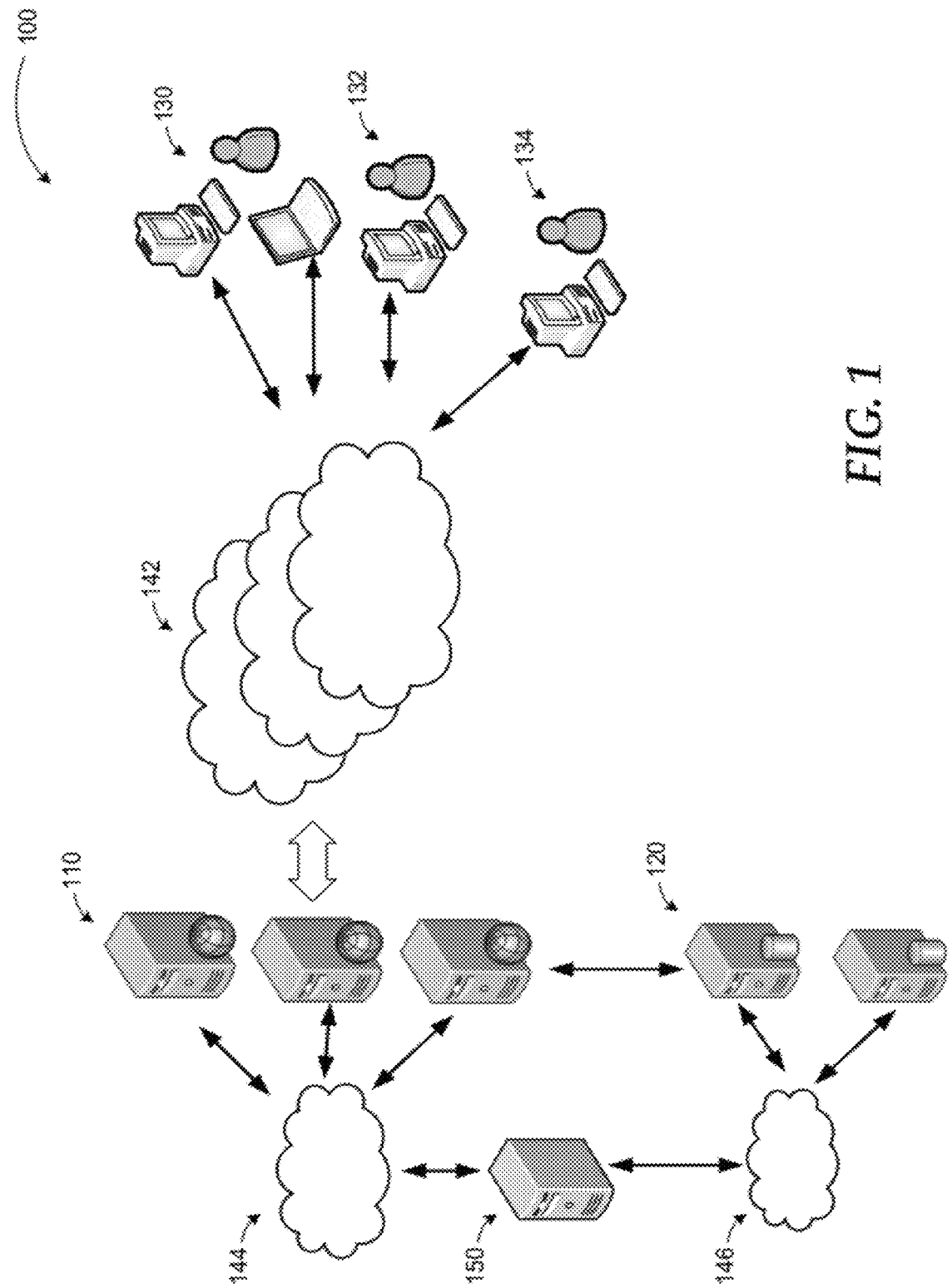
FIG. 1 is a diagram illustrating example components of a web based system, where embodiments may be implemented.

As briefly described above, browser caching may be optimized by employing front end server managed file identifier attribute(s) to determine whether or not to tell the client to cache the file being served due to a change associated with the original file. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a server, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable storage media.

Throughout this specification, the term "platform" may be a combination of software and hardware components for managing computer and/or network operations in a web application environment, where embodiments may be implemented. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 is a diagram illustrating example components of a web based system, where embodiments may be implemented. In diagram 100, front servers 110 may execute one or more web applications that enable clients to access files and data via network(s) 142. The network(s) 142 may be local networks or an external entity such as an internet based infrastructure providing wired or wireless connectivity. Network nodes may connect to each other through unsecured or secured connectivity. An example of a secured connectivity may be a Virtual Private Network (VPN) established among the network nodes with the use of encrypted communications.

The front end servers 110 may communicate with the clients through a variety of protocols, an example of which may be the Hyper Text Transport Protocol (HTTP). The front end servers 110 may also provide services to accommodate organization specific end user applications to distribute documents and other data (e.g. RSS feeds, Voice over IP "VOIP" application services, scripts results, etc.) to users. An example of such services may be an end user collaboration application that integrates user virtual meetings, communications, and document sharing. Web applications enable a user to access services through multiple client devices (e.g. clients 130) or multiple users to access the same service simultaneously (e.g. clients 132, 134). Data associated with the web applications may be stored in one or more content servers 120. Content servers 120 may be file servers or database servers managing one or more databases that host files indexed by attributes. The content servers 120 may be optimized to faster retrieve and transmit frequently requested documents. In addition to onsite backup solutions, the content servers may backup documents to offsite storage facilities for secure document retention.

Front end server 110 may communicate with content servers 120 directly or through a back end server 150. The communication between front end servers 110 and back end server 150 may be via network(s) 144, and the communication between back end server 150 and content servers 120 may be via network(s) 146. Networks 142, 144, and 146 may also be the same network(s). For example, geographic diversity or high load requirements may require a service to employ a plurality of front end servers 110 (e.g. for each geographic segment of the service area) and a single back end server 150 (or a lesser number compared to the front end servers). Thus, processing time availability for the back end server(s) is relatively limited compared to the processing time availability for the front end servers. Also, it may take longer to go from client→front end→back end→front end→client than it does to go from client→front end→client or even client to itself.

In an example scenario, front end servers 110 may provide a collaborative service, where users can view, edit, and share various kinds of documents. In a conventional web service, where all documents may be stored at the content servers 120, users may experience delays in accessing documents due to network capacity, server delays, and comparable reasons. In addition to network related approaches for optimizing traffic between the clients and the servers, one method for optimizing system performance may be caching some documents (or files) at the clients (e.g. browsers executed at client devices to access the web service). Front end servers according to some embodiments may employ file identifier attribute to determine changes (at the content servers) to locally cached files and provide updated versions of the files (or data) to the clients without overburdening the back end server.

Figure 2:
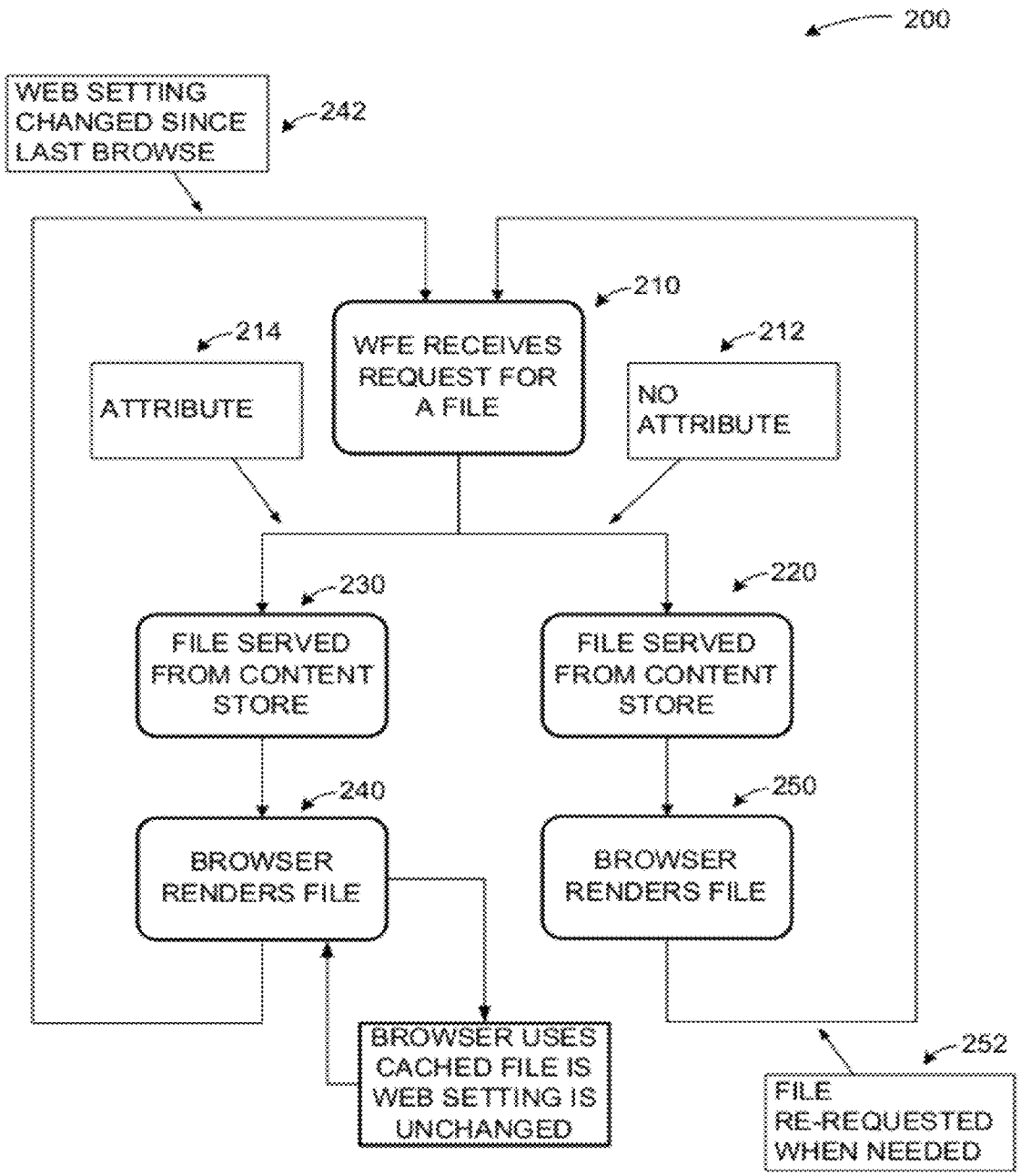
FIG. 2 illustrates example steps in a deterministic marking based browser caching service.

FIG. 2 illustrates example steps in a deterministic marking based browser caching service. In a system according to embodiments, a web front end (WFE) server may provide one or more files upon receiving a request to a client (210). For example, a client browser requesting a website to render may receive textual, graphic, audio, etc. files from the WFE server. Some of those files may be relatively static (i.e. their content not changing frequently). Thus, the WFE server may indicate to the client in the file metadata, for example, that one or more of those files can be cached locally enabling the client to use the files from its local cache in subsequent renderings and reducing network and processing burdens. In the case, where the WFE server does not use a file identifier attribute to determine file status (212), the file may be served from content store (220), rendered by the client browser (250) with or without caching and re-requested when needed (252).

In an example implementation according to some embodiments, the WFE server may employ an attribute associated with the requested file (214) such as an appended parameter, a pattern, a directory associated with the file, or similar properties to keep track of changes to the file. For example, the attribute may be a parameter appended to the Uniform Resource Locator (URL) identifying the location of the requested file. Of course, other types of attributes may also be used to mark the file. Upon receiving a request, the file is served from the content store (230), and the browser may render the file (240) by caching it locally. The locally cached file may be used by the browser as long as a web setting associated with the file remains unchanged.

If a web setting associated with the file is changed since last browse by the client (242), the WFE server may determine whether or not to tell the client to cache the file being served based on the file identifier attribute. Then, the WFE server may provide the client with an updated version of the file reflecting the latest changes (i.e., a new link). Thus, the server in essence is indicating to the browser to request a new file instead of providing it an identical link to the file that is already in the client cache. While a file identifier may be used to track latest changes to data server side and to determine whether locally cached versions should be replaced, a mechanism according to embodiments may also be used to track and provide multiple versions of data to different clients. For example, the WFE may maintain more than two versions of a file and track them based on the attribute. These different versions may be provided to clients that use (need) the different versions.

As discussed above, back end servers are usually smaller in number and limited in resources compared to front end servers. A system according to other embodiments may reduce processing burden of the back end servers by employing a cache control number, which may be incremented (or decremented) each time a web setting associated with a set of files stored at content stores is changed. Thus, the front end server may determine without the back end server having to process each request whether (and which) clients need to be updated with the changed file and provide that to clients requesting a web page for example. Thus, multiple cached files may be invalidated (so they can be re-supplied to the client(s)) using a common value (e.g. a web setting) and then changing that value.

According to further example embodiments, a parameter may be attached to the file identifier. For example, a parameter appended to the URL of the file (e.g. www.myexamplewebsite.com/examplefile.doc/cachetag). In some examples, a value may be associated with the parameter (e.g. cachetag=2 or cachetag=3), where the number may be used as a cache control number as discussed above. According to yet other embodiments, the file identifier attribute may be used by the front end server to indicate an expiration date (time) for the file. Thus, regardless of whether a web setting associated with the file has changed, the front end server may begin replacing the cached file with a new one after the expiration date indicated by the attribute.

Figure 3:
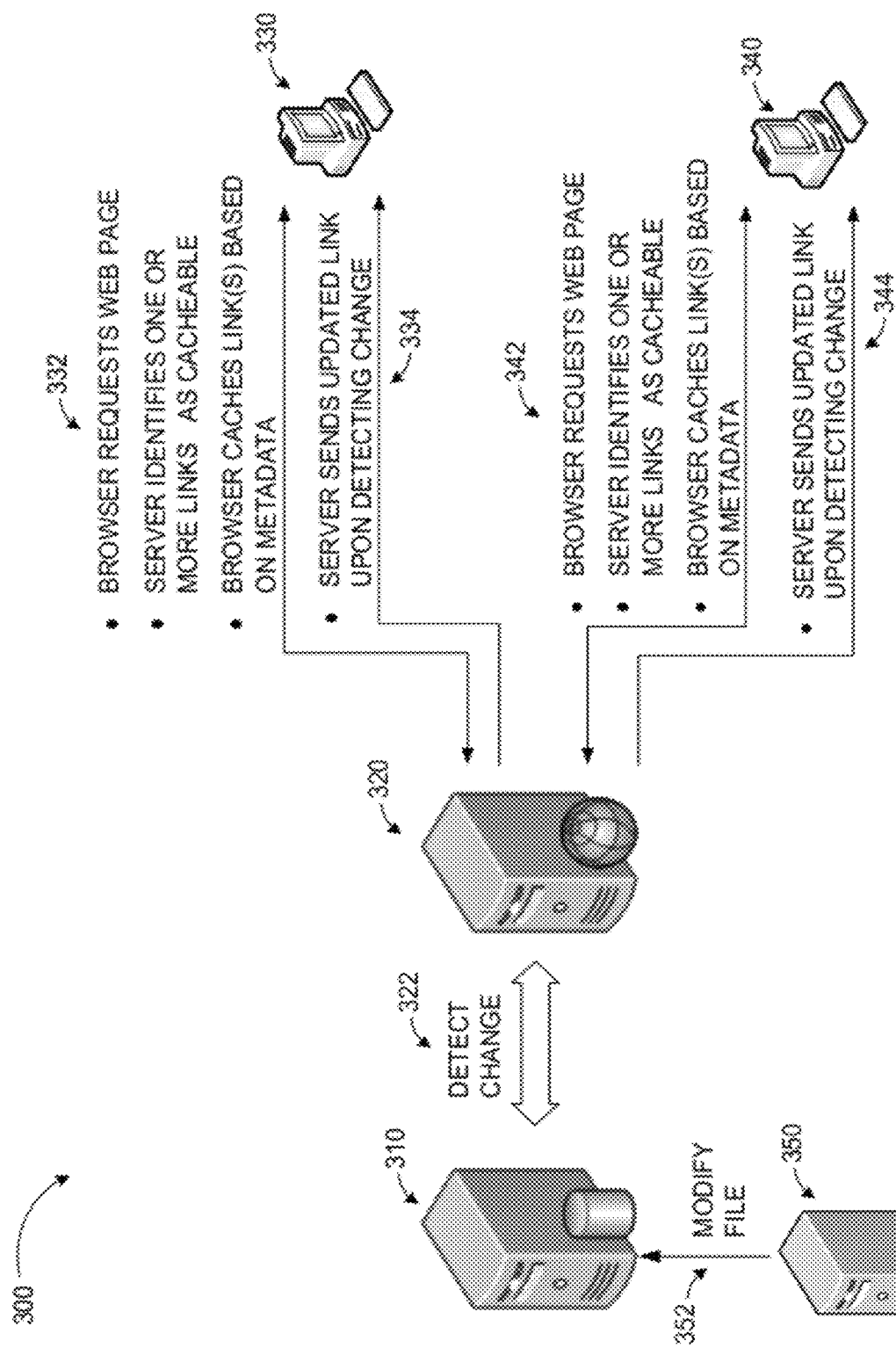
FIG. 3 illustrates example scenarios according to some embodiments.

FIG. 3 illustrates example scenarios according to some embodiments. As shown in diagram 300, web server 320 may provide a web based service to clients 330 and 340 with data associated with the web service being stored at content server 310. A third party server 350 may be used to provide new or modified content to content server 310.

According to one example scenario 332, client 330 may request a web page to render for a user. The web page may include one or more links to files (or other forms of data) some of which may be locally cacheable. Web server 320 may identify those files using a file identifier attribute as discussed previously. The identification is transparent to the client, which caches the files based on metadata or similar mechanism. Client 340 may have a similar interaction (342) with web server 320 receiving the files associated with the requested web page and caching some of them locally.

At a later time point, third party server 350 may modify one (or more) of the files (352) and submit to content server 310. The modified file(s) may be detected by the web server as a web setting change resulting in the web server 320 modifying the file identifier attribute (e.g. a pattern of the file identifier, an appended parameter of the file identifier, or a directory of the file). Thus, the link to the modified file is effectively changed. When either one of the clients 330 and 340 request the same web page again, web server 320 may determine that the link to the modified file is different and provide the new link to the updated file, thereby effectively invalidating the locally cached file. The determination at the web server 320 may include the server upon receiving the web page request providing the new link. According to other embodiments, the server may supply the newest version ignoring the attribute, the old version if the client requests the old link, or generate a file not found exception. The process is performed at the web server (i.e. front end) of the web service system without burdening the back end of the system with the file changes for each requesting client. Furthermore, the changes are tracked through a simple mechanism independent of individual clients, and the clients do not have to be aware of file status.

The file identifier attribute based cache optimization mechanism may be employed for document files such as word processing documents, spreadsheets, presentations, etc., but also for other types of files such as audio, video, data stream, script results, style class files that are generated using a theme infrastructure, wild pages, news pages, and similar ones. Essentially, the attribute may be used for anything that can change on the server and would otherwise require re-computation on every browse. The attribute may also include (in addition to the above listed examples) a query string on a link, a particular character, a file name, a sub-site, or comparable ones, that are detectable by the web server 320.

The systems and implementations of optimizing browser caching discussed above are for illustration purposes and do not constitute a limitation on embodiments. Data in a networked environment may be cached at clients and replaced by the front end servers using a file identifier attribute employing other modules, processes, and configurations using the principles discussed herein.

Figure 4:
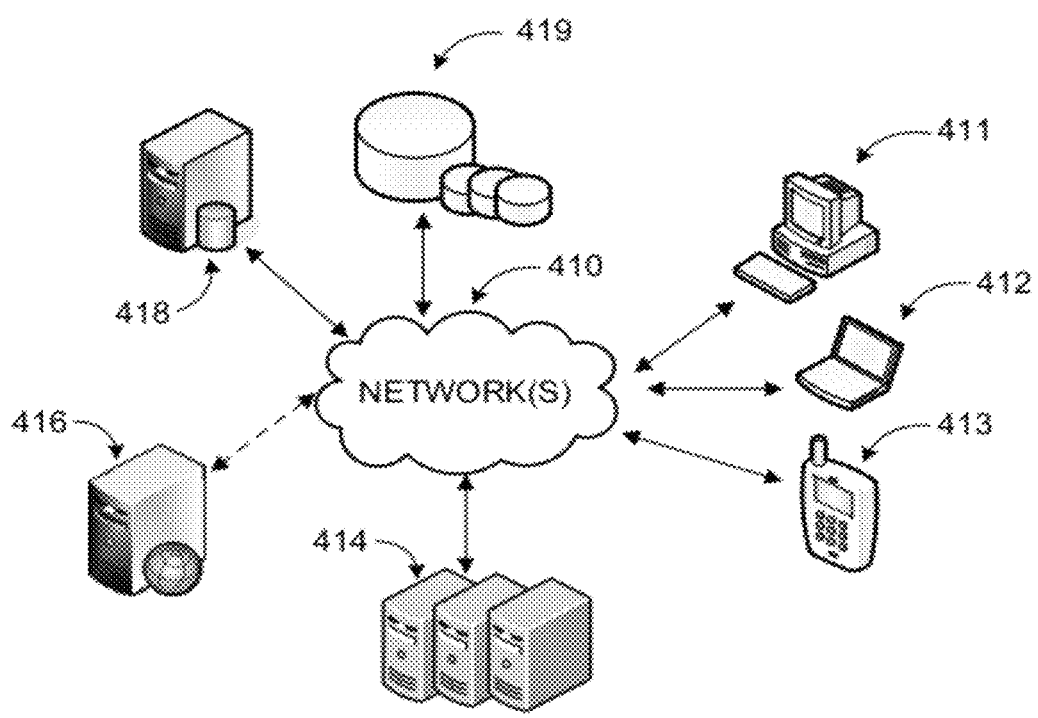
FIG. 4 is a networked environment, where a system according to embodiments may be implemented.

FIG. 4 is an example networked environment, where embodiments may be implemented. A browser caching optimization algorithm may be implemented via software executed over one or more servers 414 or a single server (e.g. web server) 416 such as a hosted service. The platform may communicate with client applications on individual computing devices such as a smart phone 413, a laptop computer 412, or desktop computer 411 ('client devices') through network(s) 410.

As discussed above, a web front end server may execute the algorithm to track cacheable files using a file identifier attribute. If a file is cacheable, one or more of the client devices 411-413 may cache the file. When a web setting associated with the file changes, the web front end server may detect the change and modify the attribute, effectively changing a link to the file. This may trigger an effective invalidation of the locally cached file when the client submits a new request (e.g. for a web page) enabling scalable updating of locally cached files in a transparent manner to the clients and a back end server.

Client devices 411-413 may enable access to applications executed on remote server(s) (e.g. one of servers 414) as discussed previously. The server(s) may retrieve or store relevant data from/to data store(s) 419 directly or through database server 418.

Network(s) 410 may comprise any topology of servers, clients, Internet service providers, and communication media. A system according to embodiments may have a static or dynamic topology. Network(s) 410 may include secure networks such as an enterprise network, an unsecure network such as a wireless open network, or the Internet. Network(s) 410 may also coordinate communication over other networks such as Public Switched Telephone Network (PSTN) or cellular networks. Furthermore, network(s) 410 may include short range wireless networks such as Bluetooth or similar ones. Network(s) 410 provide communication between the nodes described herein. By way of example, and not limitation, network(s) 410 may include wireless media such as acoustic, RF, infrared and other wireless media.

Many other configurations of computing devices, applications, data sources, and data distribution systems may be employed to implement browser caching optimization through deterministic marking of files. Furthermore, the networked environments discussed in FIG. 4 are for illustration purposes only. Embodiments are not limited to the example applications, modules, or processes.

Figure 5:
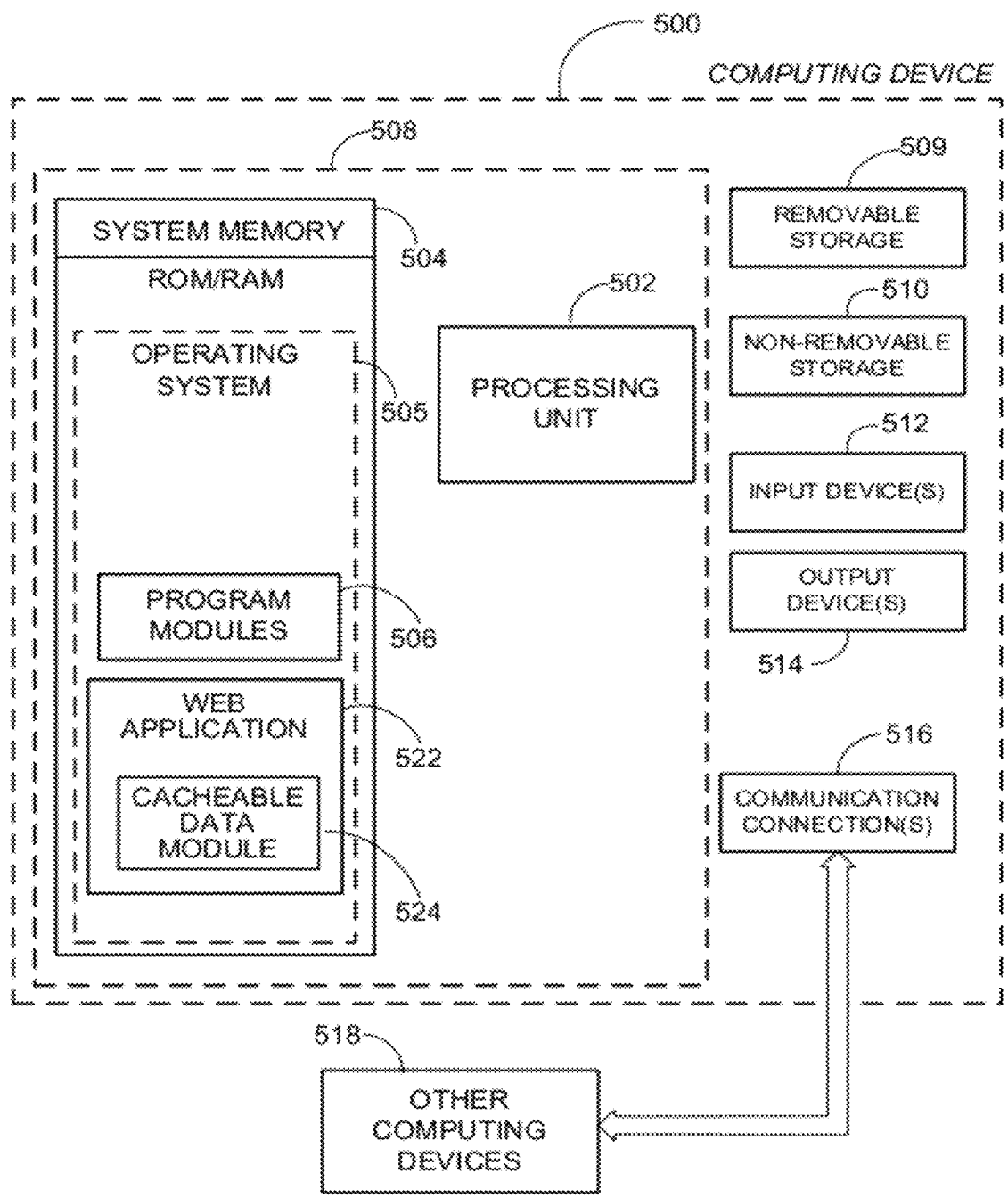
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may be a web server employing a file identifier attribute based browser cache optimization in a web application environment and include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS® operating systems from MICROSOFT CORPORATION of Redmond, Wash. The system memory 504 may also include one or more software applications such as program modules 506, web application 522, and cacheable data module 524.

Web application 522 may be part of a service that provides structured and unstructured data to client applications such as documents, formatting files, etc. Cacheable data module 524 may identify files that can be cached locally by browsers or similar client applications using a file identifier attribute as discussed previously. Upon detecting a change in a web setting associated with a file, the cacheable data module 524 may modify the attribute and provide a new link with the changed attribute (thus, updated/modified/etc. data) to requesting clients, thereby invalidating and replacing out-of-date locally cached data. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wireless network in a distributed computing environment, a satellite link, a cellular link, and comparable mechanisms. Other devices 518 may include computer device(s) that execute communication applications, storage servers, and comparable devices. Communication connection(s) 516 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be co-located with each other, but each can be only with a machine that performs a portion of the program.

Figure 6:
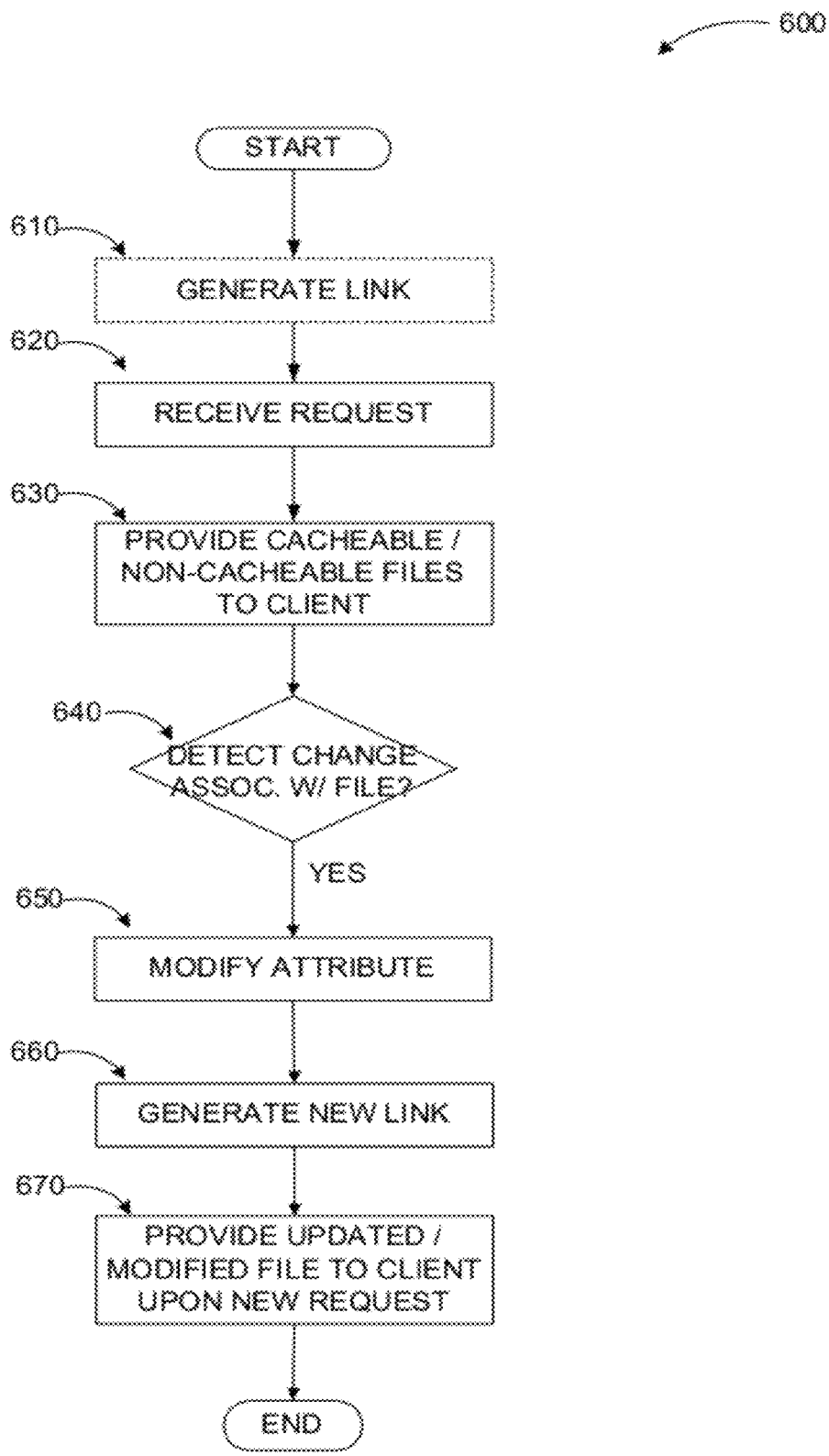
FIG. 6 illustrates a logic flow diagram for a process of optimizing browser caching through deterministic marking of files according to embodiments.

FIG. 6 illustrates a logic flow diagram for process 600 of optimizing browser caching through deterministic marking of files according to embodiments. Process 600 may be implemented by a server in a web application environment providing files and other forms of data to clients.

Process 600 begins with optional operation 610, where the server may generate links to cacheable files that include a file identifier attribute to be used in detecting changes associated with the files and invalidating cached versions. At operation 620, the server receives a request from a client application such as a web page request from a browser. The request may be associated with one or more files, some of which may be locally cacheable. The cacheable file(s) along with the non-cacheable ones may be provided to the client application at operation 630. Client applications may cache the cacheable files based on their metadata or similar mechanism.

Subsequently, the server may detect a change to a web setting associated with the cacheable file(s). If a change is detected at decision operation 640, the server may modify the file identifier attribute at operation 650, which is used to generate a new link at operation 660 and invalidate the cached version of the file at operation 670 when a client submits another request involving the cached file.

The operations included in process 600 are for illustration purposes. Optimizing browser caching processes according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part by a computing device for optimizing browser caching, the method comprising:
    generating a file identifier for a cacheable file that includes a file identifier attribute at a first server executing a web application configured to provide structured and unstructured data to client applications;
    receiving a request that includes the cacheable file at the first server;
    retrieving the cacheable file from a second server;
    providing the cacheable file to a requesting client along with one or more non-cacheable files if requested by the client;
    modifying the file identifier attribute in response to detecting a change associated with the cacheable file;
    in response to receiving another request, providing the cacheable file associated with the modified identifier attribute if the content indicated by the identifier exists such that the provided cacheable file with the modified identifier attribute replaces an out-of-date un-modified cacheable file;

in response to receiving a request to receive an un-modified cacheable file, providing the cacheable file with the un-modified identifier attribute;

in response to receiving a request to receive an un-locatable cacheable file, providing a file-not-found exception in response; and maintaining at least another version of the cacheable file and providing the at least other version of the cacheable file to another requesting client using the other version.

2. The method of claim 1, wherein the file identifier attribute includes one of: a pattern, a file name, a parameter attached to the file identifier, a directory associated with the cacheable file, and a query string.

3. The method of claim 1, wherein modifying the file identifier attribute includes one of incrementing and decrementing a cache control number used as the file identifier attribute.

4. The method of claim 1, wherein the first server is a front end server and the second server is a back end server.

5. The method of claim 1, wherein the change associated with the cacheable file includes one of a content change and a web setting change.

6. The method of claim 1, wherein the file identifier attribute is transparent to the requesting client.

7. The method of claim 1, wherein the cacheable file includes one of: a word processing document, a spreadsheet, a presentation, an audio file, a video file, a data stream, a script file, a shared page, a news page, and a style class file.

8. The method of claim 1, wherein the file identifier is a Uniform Resource Locator (URL) and the requesting client is a browser.

9. The method of claim 1, wherein the file identifier attribute defines an expiration period for the cacheable file to the first server.

10. The method of claim 9, wherein the expiration period is set to indefinite.

11. A system to provide a web service with optimized browser caching, the system comprising:
a first computing device comprising:
a memory configured to store instructions; and
a processor coupled to the memory, the processor configured to:
generate an identifier for cacheable content that includes an identifier attribute at a cacheable data module executed on a web application, the web application configured to provide structured and unstructured data to client applications;
receive a request that includes the cacheable content;
retrieve the cacheable content from one or more content stores;
provide the cacheable content to a requesting client, wherein the cacheable content is marked to be cached at the requesting client for subsequent use;
provide non-cacheable content if requested by the client;
identify the cacheable content transparently to the requesting client using a caching mechanism based on metadata of the cacheable content;
if a web setting change associated with the cacheable content is detected, modify the identifier attribute at the cacheable data module; and
in response to receiving another request that includes the identifier for the cacheable content, provide cacheable content associated with the modified identifier attribute if the content indicated by the identifier exists at the cacheable data module such that the provided cacheable file with the modified identifier attribute replaces an out-of-date un-modified cacheable file.

12. The system of claim 11, wherein the web setting change is a content change.

13. The system of claim 11, further comprising:
a second computing device comprising:
a memory configured to store instructions; and
a processor coupled to the memory, the processor configured to:
manage the one or more content stores, wherein the identifier attribute is generated and employed by the first computing device in a transparent manner to the second computing device.

14. The system of claim 11, comprising a plurality of first computing devices acting as front end servers communicating with a single second computing device acting as a back end server configured to manage the one or more content stores.

15. The system of claim 11, wherein the identifier attribute includes a cache control value comprising one of a character, a number, and a string.

16. The system of claim 15, wherein the identifier attribute is modified by one of incrementing, decrementing, and resetting the cache control value.

17. A computer-readable storage medium with instructions stored thereon for optimizing browser caching, the instructions comprising:
generating a Uniform Resource Locator (URL) link with a URL attribute for cacheable content at a web server executing a web application that provides structured and unstructured data to client applications including at least one of: documents and formatting files;
receiving a request for a web page that includes the cacheable content at the web server;
retrieving the cacheable content from a back end server;
providing the cacheable content along with additional web page content and non-cacheable content to a requesting browser;
identifying the cacheable content transparently to the requesting browser using a caching mechanism based on metadata of the cacheable content at a cacheable data module;
modifying the URL attribute in response to detecting a web setting change associated with the cacheable content at the cacheable data module;
generating a new URL link with the modified URL attribute; and
in response to receiving another request for the web page from the requesting browser:
determining that the new URL link is to be provided with the web page;
serving the new URL link along with other content associated with the requested web page; and
maintaining at least another version of the cacheable content and providing the at least other version of the cacheable content to another requesting browser using the other version;
in response to receiving a request to receive un-modified cacheable content, providing the cacheable content with the un-modified identifier attribute; and
in response to receiving a request to receive un-locatable cacheable content, providing a file-not-found exception in response.

18. The computer-readable storage medium of claim 17, wherein the URL attribute is transparent to the requesting browser and includes at least one from a set of: a pattern, a file name, a parameter attached to the URL, a directory associated with the cacheable content, a character, a sub-site, and a query string attached to the URL.

19. The computer-readable storage medium of claim 17, wherein the cacheable content includes at least one of: a document file, an image file, an audio file, a video file, a data stream, a news feed, a Voice over Internet Protocol (VOIP) application data stream, and a script file.

20. The computer-readable storage medium of claim 17, wherein the URL attribute is transparent to the back end server enabling the web server to invalidate cached content by a plurality of browsers isolating the back end server from the invalidation.

* * * * *